US005739183A

United States Patent [19]
Wu et al.

[11] Patent Number: 5,739,183
[45] Date of Patent: Apr. 14, 1998

[54] COLORLESS, NON-TOXIC, STABILIZED AQUEOUS SOLUTION OF A $C_1$-$C_5$ ALKYL VINYL ETHER AND MALEIC ACID COPOLYMER

[75] Inventors: Chi-San Wu; James Curry, both of Wayne, N.J.; James P. Cullen, Bartonsville, Pa.; John S. Mc Ewan, Paducah, Ky.

[73] Assignee: ISP Investments Inc., Wilmington, Del.

[21] Appl. No.: 528,380

[22] Filed: Sep. 13, 1995

[51] Int. Cl.⁶ .................................................. C08K 5/16
[52] U.S. Cl. .................................... 524/239; 524/556
[58] Field of Search .............................. 524/239, 556

[56] References Cited

U.S. PATENT DOCUMENTS 3,531,427  9/1970  Kervenski et al. ................ 524/208

*Primary Examiner*—Jeffrey T. Smith
*Attorney, Agent, or Firm*—Walter Katz; Marilyn J. Maue; Joshua J. Ward

[57] ABSTRACT

A method of stabilizing an aqueous solution of an acid copolymer of maleic acid and a $C_1$-$C_5$ alkyl vinyl ether against degradation in viscosity or molecular weight upon storage for an extended period of time in aqueous solution at ambient conditions, with a single stabilizing agent, which comprises forming the acid copolymer directly from a slurry of corresponding anhydride in an organic solvent by hydrolysis in water, and adding including ethylenediamine tetraacetic acid (EDTA), or salt thereof, as the single stabilizing agent to the solution either before or after hydrolysis.

4 Claims, No Drawings

COLORLESS, NON-TOXIC, STABILIZED AQUEOUS SOLUTION OF A $C_1$-$C_5$ ALKYL VINYL ETHER AND MALEIC ACID COPOLYMER

BACKGROUND OF THE INVENTION

1. Field of the Invention

This invention relates to copolymers of $C_1$-$C_5$ alkyl vinyl ether and maleic acid, and, more particularly, to colorless, stabilized aqueous solutions of such copolymers made by hydrolyzing the corresponding anhydride copolymer before drying it to a powder.

2. Description of the Prior Art

The copolymerization of maleic anhydride and a $C_1$-$C_5$ alkyl vinyl ether yields a copolymer which is more properly characterized as an interpolymer wherein both ethylenically unsaturated moieties enter into the formation of the same polymer chain. It has been indicated by infra-red spectroscopy, nuclear magnetic resonance spectroscopy and other chemical analyses that alkyl vinyl ethers and maleic anhydride interpolymerize in the molar ratio of about 1:1, the polymer chain thereof containing alternating anhydride units and alkyl vinyl ether units. The resulting anhydride interpolymers can be hydrolyzed in water to the corresponding acid interpolymer. Such acid interpolymers are known to be useful in personal care products and other applications.

Generally, copolymers of maleic acid and an alkyl vinyl ether, e.g. methyl vinyl ether, e.g. Gantrez® 97, are prepared by hydrolyzing powders of the anhydride precursor copolymer, e.g. Gantrez® AN-169.

Under normal ambient storage conditions, however, it is known that copolymers of maleic acid and an alkyl vinyl ether prepared from the anhydride powder will degrade with time, as evidenced by a decrease in molecular weight and viscosity of the copolymer.

Kervinski, in U.S. Pat. No. 3,531,427, found that the molecular weight of such copolymers could not be stabilized with only a single stabilizing agent, but that it could be stabilized by using a mixture consisting of selected oxidizing and/or reducing agents, e.g. ethylenediamine tetraacetic acid (EDTA), in combination with other secondary additives. The use of such a stabilization mixture, however, may not be suitable, due to the toxicity of the secondary agent, or discoloring of the copolymer solution in the presence of the stabilizer mixture.

Frosch, et al, in Ger. Patent 4,213,972 A1, described the use of a single stabilizer agent for copolymers of maleic acid or maleic anhydride and alkyl vinyl ethers which was a phenol containing a tert-butyl group. However, in general, phenols are not favored due to their toxicity.

Accordingly, it is an object of this invention to provide a colorless, stabilized aqueous solution of a copolymer of a $C_1$-$C_5$ alkyl vinyl ether and maleic acid which is suitable for personal care and industrial applications, using a single stabilizing agent which is effective for stabilizing the copolymer even when used at low concentrations.

Another object of the invention is to provide a process of preparing such colorless, stabilized aqueous solutions having higher viscosities than available previously and which will retain their initial viscosity levels over extended periods of time.

A specific object and feature of the invention is to provide a process for stabilizing such copolymers in which the acid copolymer is made by hydrolyzing the corresponding anhydride copolymer while it is still in a wet state, i.e. before drying it to a powder.

SUMMARY OF THE INVENTION

What has been discovered herein is that a single stabilizing agent such as EDTA, and salts thereof, can stabilize an aqueous solution of an acid copolymer of maleic acid and a $C_1$-$C_5$ alkyl vinyl ether against degradation in viscosity or molecular weight upon storage for an extended period of time in aqueous solution at ambient conditions, when it is made by forming corresponding anhydride copolymer in an organic solvent, and, while it is still wet, i.e. before drying to a powder, hydrolyzing such wet anhydride copolymer to the corresponding acid copolymer. The EDTA stabilizer can be added either before or after hydrolysis, to provide a stabilized solution of the acid copolymer.

DETAILED DESCRIPTION OF THE INVENTION

A high molecular weight copolymer of maleic acid and methyl vinyl ether (Gantrez® S-97) was prepared directly from the anhydride precursor (Gantrez® AN-169) by hydrolysis with water. The anhydride precursor starting material for the hydrolysis was a benzene slurry, in wet form, without the conventional drying step to form a powder. During the hydrolysis, the benzene solvent is removed. The acid copolymer is stabilized by the addition of EDTA, or salts thereof. The final product is an aqueous solution of the acid copolymer stabilized with EDTA, or salt thereof. Typical salts include the disodium, trisodium, tetrasodium or disodium-calcium salt. The stabilizing amount of EDTA is about 50 to 1000 ppm, preferably about 250 ppm.

EXAMPLES

In a typical run, 500 g of a benzene slurry (50% solids) of the anhydride copolymer of maleic anhydride and methyl vinyl ether (GANTREZ® AN169) and 1100 g of water was hydrolyzed in a 2-liter, 5-necked, jacketed glass reaction flask accommodating a stirring shaft for mixing, a water-cooled condenser to collect benzene vapors, a rubber septum for introducing additional water, and a nitrogen sparge tube. The flask allowed for a positive pressure of nitrogen to be maintained during the reaction.

The reaction was started by stirring the mixture with a subsurface nitrogen sparge for 20 minutes. Then the mixture was heated at 70° C. for 4 hours with atmospheric nitrogen sparge. During hydrolysis, benzene and water were collected in a receiving flask below the condenser. Heated water was added during the reaction to maintain a final solids content of 10 to 16%. No residual benzene level was detectable, i.e. it was <0.2 ppm.

The acid copolymer solution then was spiked with EDTA at 0.025% and mixed for 3 days on a slowly rotating wheel. The stabilized solution was stored for 6-months in clear, capped glass bottles. Then the solutions of Gantrez® S97 were analyzed for molecular weight and viscosity. The results are shown in Table 1 below.

TABLE 1

| Copolymer | Additive | $^\square$Mw × $10^6$ | *Specific Viscosity |
|---|---|---|---|
| Gantrez ® S97 (from wet Gantrez ® AN-169) | No EDTA | 0.80→0.53 | 1.30→0.95 |
| Gantrez ® S97 (from wet Gantrez ® AN-169) | EDTA (0.025%) | 0.80→0.71 | 1.30→1.20 |

TABLE 1-continued

| Copolymer | Additive | $Mw \times 10^6$ | *Specific Viscosity |
|---|---|---|---|
| Gantrez ® S97 (from powders of Gantrez ® AN-169) | No EDTA | | 7.44→1.39 |
| Gantrez ® S97 (from powders of Gantrez ® AN-169) | EDTA (0.025%) | | 7.78→1.27 |

$Mw$ by GPC relative to PEO, Shodex column, solvent equivalent to viscosity solvent below.
*0.63 mm Ubbelhode tube, 25° C., 0.25% (w/v) solution using 0.2M LiNO$_3$, 0.1M TRIS buffer adjusted to pH 9.
**1% in water.

The results showed that polymer solutions with EDTA maintained a molecular weight about 88% of the MW of initial polymer. The viscosity data paralleled the MW trends, wherein EDTA maintained 92% of Gantrez® S97 viscosity after a 6-month period.

While the invention has been described with particular reference to certain embodiments thereof, it will be understood that changes and modifications may be made which are within the skill of the art. Accordingly, it is intended to be bound only by the following claims, in which:

What is claimed is:

1. A method of stabilizing an aqueous solution of an acid copolymer of maleic acid and a $C_1$–$C_5$ alkyl vinyl ether against degradation in viscosity or molecular weight upon storage for an extended period of time in aqueous solution at ambient conditions, with a single stabilizing agent, which comprises forming the acid copolymer directly from a slurry of corresponding anhydride in an organic solvent by hydrolysis in water, and adding including ethylenediamine tetraacetic acid (EDTA), or salt thereof, as the single stabilizing agent to the solution either before or after hydrolysis.

2. A method according to claim 1 wherein said $C_1$–$C_5$ alkyl vinyl ether is methyl vinyl ether.

3. A method according to claim 1 wherein EDTA is present in an amount of 50 to 10,000 ppm in said solution.

4. A method according to claim 1 wherein EDTA is present as the disodium, trisodium, tetrasodium or disodium, calcium salt.

* * * * *